(12) United States Patent
Murakami

(10) Patent No.: US 9,995,612 B2
(45) Date of Patent: Jun. 12, 2018

(54) CORIOLIS MASS FLOW METER

(71) Applicant: ATSUDEN CO., LTD., Tokyo (JP)

(72) Inventor: Eiichi Murakami, Tokyo (JP)

(73) Assignee: ATSUDEN CO., LTD., Tokyo (JP)

( * ) Notice: Subject to any disclaimer, the term of this patent is extended or adjusted under 35 U.S.C. 154(b) by 0 days. days.

(21) Appl. No.: 15/296,097

(22) Filed: Oct. 18, 2016

(65) Prior Publication Data

US 2017/0122787 A1 May 4, 2017

(30) Foreign Application Priority Data

Oct. 28, 2015 (JP) .................................. 2015-212060
Feb. 5, 2016 (JP) .................................. 2016-020668
May 16, 2016 (JP) .................................. 2016-097983

(51) Int. Cl.
*G01F 1/84* (2006.01)
(52) U.S. Cl.
CPC .......... *G01F 1/8413* (2013.01); *G01F 1/8422* (2013.01); *G01F 1/8472* (2013.01)
(58) Field of Classification Search
CPC ........................................................ G01F 1/84
USPC ..................................................... 73/861.355
See application file for complete search history.

(56) References Cited

U.S. PATENT DOCUMENTS

| 7,127,952 | B2* | 10/2006 | Bitto | ..................... G01F 1/8409 |
| | | | | 73/861.355 |
| 7,437,949 | B2* | 10/2008 | Nakao | ................... G01F 1/8409 |
| | | | | 73/861.355 |
| 8,365,613 | B2* | 2/2013 | Tsubota | ................ G01F 1/8418 |
| | | | | 73/861.355 |
| 9,360,358 | B2* | 6/2016 | Wang | ..................... G01F 1/8409 |
| 2012/0186363 | A1* | 7/2012 | Egner | ................... G01F 1/8427 |
| | | | | 73/861.357 |
| 2014/0122008 | A1* | 5/2014 | Dondoshansky | ......... G01F 1/84 |
| | | | | 702/100 |
| 2015/0253231 | A1* | 9/2015 | Gao | ....................... G01N 9/002 |
| | | | | 73/32 A |

FOREIGN PATENT DOCUMENTS

JP 1991-041319 A 2/1991

* cited by examiner

*Primary Examiner* — Jewel V Dowtin
(74) *Attorney, Agent, or Firm* — Li & Cai Intellectual Property (USA) Office

(57) ABSTRACT

A locking portion is attached on a curved tube portion of a measurement tube, and a hole portion is formed at a distal end of the locking portion in a vertical direction, and a conical depression is provided on an inner wall surface on outside of the hole portion. A coupling ring of a coupling portion engages the hole portion, and a pivot needle, coming into abutment with the conical depression abuts from an inner wall surface of the coupling ring which faces the conical depression. The other end of the coupling ring is elastically attracted toward a fixing portion via an elastic member formed of an extension spring.

13 Claims, 5 Drawing Sheets

CORIOLIS MASS FLOW METER

BACKGROUND OF THE INVENTION

1. Field of the Invention

The present invention relates to a Coriolis mass flow meter that elastically retains part of a measurement tube.

2. Related Art

The Coriolis mass flow meter is a flow meter of a type obtaining a mass flow by measuring a Coriolis force based on the fact that the Coriolis force acting on a mass point of a mass m moving toward or away from a center of rotation of a rotational vibrating system at a velocity V is proportional to a product of the mass m and the velocity V.

Compared with differential, electromagnetic, and volumetric flow meters, the Coriolis mass flow meter has various superior characteristics such as being capable of obtaining a mass flow directly, having no mechanically movable portion which causes abrasion, being superior in maintainability, and, in principle, being capable of measuring a density by measuring the number of vibrations of the measurement tube.

For example, JP-A-3-41319 discloses a Coriolis mass flow meter using a U-shaped measurement tube as illustrated in FIG. 10. The measurement tube is composed of a single U-shaped measurement tube 1, and the cantilevered U-shaped measurement tube 1 repeatedly vibrates upward and downward about points fixed via mounting flanges 2a and 2b at a resonant frequency applied thereto.

Fluid to be measured flowing into the measurement tube 1 causes distortion of the measurement tube 1 by a Coriolis force generated by a flowing velocity with respect to the measurement tube 1 when flowing from an inlet port toward a curved portion of a U shape, and causes distortion of the measurement tube 1 in an opposite direction by the Coriolis force when flowing from a curved tube portion toward an outlet port, which causes a vibration of the measurement tube 1.

A vibrator 3 is provided at a distal end of the measurement tube 1, which forms the U shape, displacement detection sensors 4a and 4b are mounted on the measurement tube 1 at both sides of the curved portion.

Fluid to be measured is flowed in the measurement tube 1, and the vibrator 3 is driven, so that the measurement tube 1 is vibrated. A Coriolis force of Fc=−2 mΩ×v, where ω is an angular speed of the vibrator 3 in a direction of vibration and v is a flow velocity of the fluid to be measured, works, and the mass flow may be measured by detecting an amplitude of the vibration which is proportional to the Coriolis force Fc by using the displacement detection sensors 4a and 4b and calculating the detected result.

A metallic tube is normally used for the measurement tube 1 of the Coriolis mass flow meter of the related art to prevent a measurement error caused by deformation such that the U-shaped portion bows down under its own weight even when the measurement tube 1 is filled with the fluid to be measured, for example. However, the metallic tube is hard to process and thus it is difficult to obtain the metallic tubes having the same features by processing. When using, the size and the weight of a supporting structure are significantly large, and cost is also high.

For example, when measuring a corrosive liquid used in a semiconductor manufacturing apparatus or the like, a fluorine resin tube having high corrosion-resistant characteristics and the like has to be used. However, workability of a measurement tube is advantageous and light weight is achieved owing to the usage of the synthetic resin tube while a supporting structure subjected to less deformation and having a greater rigidity against vibrations is required.

SUMMARY

In order to solve the problem described above, it is an object of the invention to provide a compact and cost-effective Coriolis mass flow meter in which a measurement tube elastically retains at one point.

In order to achieve the above-described object, an aspect of the invention is to provide a Coriolis mass flow meter including: a measurement tube that allows passage of fluid to be measured in one direction; a fixing portion disposed at a predetermined position with respect to the measurement tube; an elastic member disposed between the measurement tube and the fixing portion; a vibration exciter unit configured to vibrate the measurement tube; and a displacement detecting unit that detects displacement of the measurement tube at two positions on an outbound tube and an inbound tube, wherein the fixing portion elastically retains the measurement tube via the elastic member.

According to the Coriolis mass flow meter of the invention, with the configuration in which the measurement tube is retained elastically, the measurement tube is prevented from being deformed under its own weight and a stable measurement of a flow rate based on a generated Coriolis force is performed.

DESCRIPTION OF EMBODIMENTS

The present invention will be described in detail with reference to embodiments illustrated in FIG. 1 to FIG. 9.

Example 1

Figure 1:
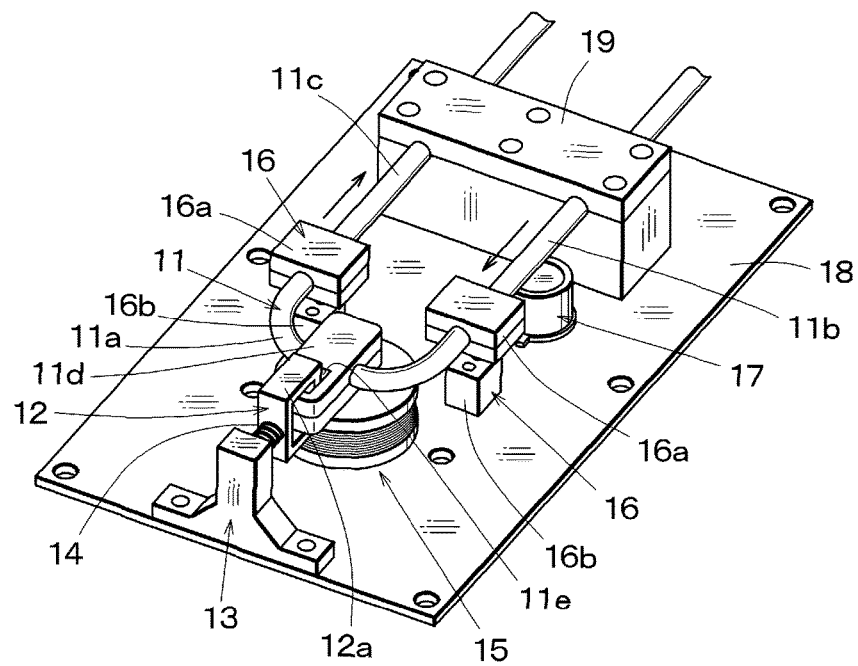
FIG. 1 is a perspective view of a Coriolis mass flow meter according to Example 1.
Figure 2:
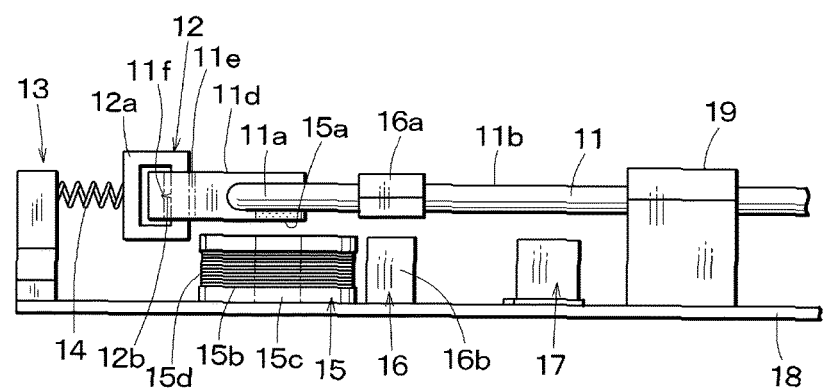
FIG. 2 is a side view of the Coriolis mass flow meter in FIG. 1.

FIG. 1 is a perspective view of a Coriolis mass flow meter according to Example 1, and FIG. 2 is a side view of the same. The Coriolis mass flow meter of Example 1 mainly includes: a measurement tube 11 that allows fluid to be measured to flow in one direction; a coupling portion 12 that retains the measurement tube 11; a fixing portion 13 that is located at a predetermined position with respect to the coupling portion 12; an elastic member 14 attached between the coupling portion 12 and the fixing portion 13; a vibration exciter unit 15 that vibrates the measurement tube 11; a displacement detecting unit 16 that detects displacement of the measurement tube 11; a temperature measuring unit 17 that measures temperature of the fluid to be measured; and a calculation control unit, which is not illustrated, configured to input and output a detection signal and a control signal with respect to the units described above and calculate a flow rate of the fluid to be measured.

The measurement tube 11 is formed of a synthetic resin, for example, is a fluorine resin tube having a diameter of, for example, 3.2 mm, and a U-shaped curved tube portion 11a at a center portion thereof. If the fluid to be measured has no corrosive property, the measurement tube 11 may be a normal synthetic resin tube instead of the fluorine resin tube. However the measurement tube 11 needs to be formed of a material having an elastic modulus which provides hardness that can transmit a vibration sufficiently and not flexible. The diameter of the measurement tube 11 given above is only an example, and the measurement tube 11 having a given diameter may be used as a matter of course.

Two parallel portions of an outbound tube 11b and an inbound tube 11c of the measurement tube 11 having a boundary at the curved tube portion 11a therebetween are held by a housing 19 disposed on a substrate 18 in an clamped manner, so that the measurement tube 11 is fixed to the housing 19.

Figure 3:
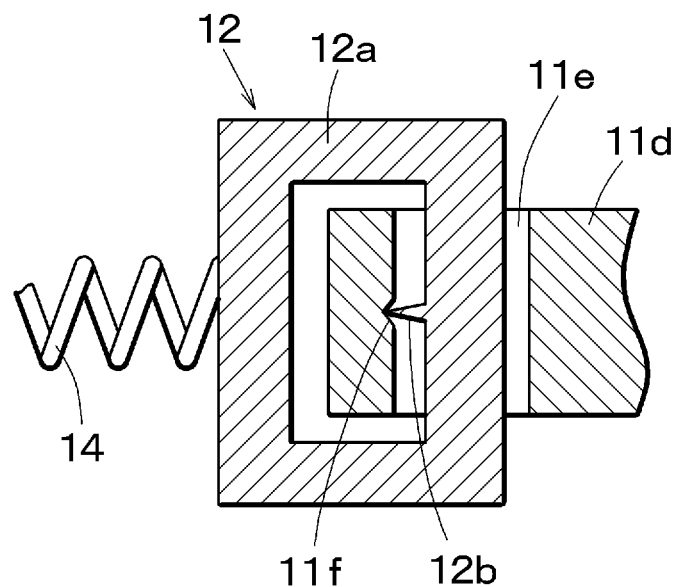
FIG. 3 is an enlarged cross-sectional view of a principal portion of the Coriolis mass flow meter.

A locking portion 11d is attached on the curved tube portion 11a of the measurement tube 11, and as an enlarged cross-sectional view of a principal portion illustrated in FIG. 3, a square hole-shaped hole portion 11e is formed at a distal end of the locking portion 11d in a vertical direction, and a conical depression 11f is provided on an inner wall surface on outside of the hole portion 11e.

A square ring-shaped coupling ring 12a of the coupling portion 12 engages the hole portion 11e, and a pivot needle 12b, which is a needle-shaped member, coming into abutment at a distal end thereof with the conical depression 11f projects from an inner wall surface which faces the conical depression 11f. The elastic member 14 formed of a coil spring or the like is attached between the coupling ring 12a and the fixing portion 13. The locking portion 11d and the coupling ring 12a may be formed either of a metal or a synthetic resin. However, when considering durability, at least the conical depression 11f and the pivot needle 12b are preferably formed of a metal.

The coupling ring 12a includes two or more components, which are not illustrated, and is formed into one component by inserting a component of the coupling ring 12a into the hole portion 11e and unitized via welding, adhesion, a bolt, and the like.

With the distal end of the pivot needle 12b coming into abutment with a bottom portion of the conical depression 11f, the locking portion 11d may be elastically attracted to the fixing portion 13 side by the elastic member 14 by one point at the distal end of the pivot needle 12b. The direction of action of the elastic member 14 is parallel to a plane connecting the outbound tube 11b and the inbound tube 11c and, in addition, a holding position is at a center of a Coriolis force that acts on the outbound tube 11b and the inbound tube 11c of the measurement tube 11. Therefore, the Coriolis force is not significantly affected.

The vibration exciter unit 15 is provided on the substrate 18 in order to generate the Coriolis force. A permanent magnet is attached to a lower side of the locking portion 11d as a vibration exciter 15a functioning as part of the vibration exciter unit 15 with a magnetic pole surface thereof facing downward. An electromagnetic coil 15b, which is an electromagnet, is provided on the substrate 18 below the vibration exciter 15a, and constitutes the vibration exciter unit 15 in magnetically cooperation with the vibration exciter 15a.

Electricity is supplied to a coil 15d wound around an iron core 15c of the electromagnetic coil 15b while switching a direction of current, and a direction of magnetic flux generated from an end of the iron core 15c is switched, whereby a magnetic attraction force and a magnetic repulsive force act on the vibration exciter 15a repeatedly. Accordingly, a predetermined vibration may be applied to the measurement tube 11 via the vibration exciter 15a and the locking portion 11d without contact.

The vibration is preferably applied to a center position of lateral symmetry of the measurement tube 11. The frequency of vibration is a resonance frequency of the measurement tube 1 or an integral multiple thereof in a state in which the measurement tube 11 is filled with the fluid to be measured, and normally, is several tens to several hundreds Hz obtained by auto tuning, and is different depending on the elastic modulus and the shape of the measurement tube 11 and the type of the fluid to be measured.

Since an amplitude of vibration applied by the vibration exciter unit 15 is minute, the measurement tube 11 may be vibrated even though the measurement tube 11 is attracted to the fixing portion 13 side. The vibration exciter 15a may be formed of a ferromagnetic body such as iron, cobalt, nickel or an alloy thereof instead of the permanent magnet. A vibration exciter mechanism other than the electromagnetic coil 15b may be employed in the vibration exciter unit 15.

In order to detect the magnitude of displacement of the measurement tube 11 due to vibration during measurement of the flow rate, that is, the magnitude of the Coriolis force, the displacement detecting units 16 based on an optical sensor are disposed at two positions on the outbound tube 11b and the inbound tube 11c of the measurement tube 11 parallel to each other. Light reflecting portions 16a are attached to the measurement tube 11 respectively, and light receiving and emitting portions 16b are disposed on the substrate 18 below the respective light reflecting portions 16a.

In each of the displacement detecting units 16, light beam from the light receiving and emitting portion 16b is directed toward the light reflecting portion 16a, and reflected light therefrom is received by the light receiving and emitting portion 16b, so that the positional displacement of the reflected light is detected. From the positional displacement, a distance from the light receiving and emitting portion 16b to the light reflecting portion 16a, that is, distances from the light receiving and emitting portions 16b to the outbound tube 11b and the inbound tube 11c are measured respectively, and amounts corresponding to amounts of distortion of the outbound tube 11b and the inbound tube 11c due to the Coriolis force may be obtained by detecting a time difference with the calculation control unit. A flow rate is obtained on the basis of the detected amounts. As the calculating method is a known method, description will be omitted.

The displacement detecting units 16 are configured to measure the distance by a method of detecting the positional displacement. However, the distance may be detected by a blurring detecting method, or an optical interferometry, and the like. Alternatively, an electromagnetic displacement detector, for example, may be used instead of a light detecting method. However, the light detecting method does not apply a force to the measurement tube 11, and the minute Coriolis force is not affected, so that measurement of the flow rate with high degree of accuracy is enabled.

The temperature measuring unit 17 that measures the temperature of the fluid to be measured in the measurement tube 11 remotely without contact is disposed on the substrate 18 below the measurement tube 11. When the measurement tube 11 is warmed up or cooled down by the temperature of the fluid to be measured, the elastic modulus vary, and the resonance vibration frequency or a surface of distortion of the measurement tube 11 minutely varies. Therefore, the temperature of the fluid in the measurement tube 11 is preferably measured in order to correct these variations. Necessity of measurement of the fluid to be measured by using the temperature measuring unit 17 is eliminated if the temperature of the fluid to be measured is measured at a position other than the Coriolis mass flow meter.

Figure 4:
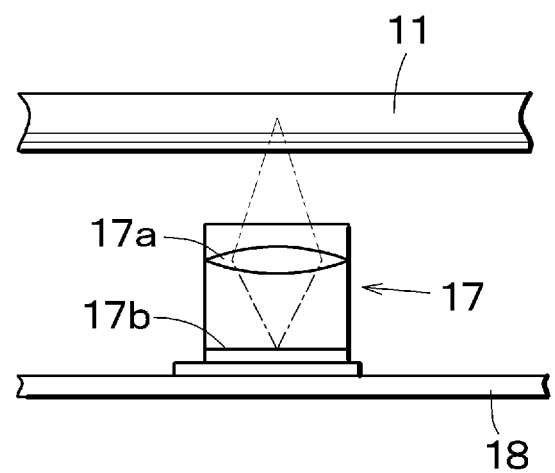
FIG. 4 is a configuration drawing illustrating a temperature measuring unit.

FIG. 4 is a configuration drawing of, for example, an infrared thermometer used as the temperature measuring unit 17, and the temperature measuring unit 17 includes a lens optical system 17a and a temperature sensing device 17b. The lens optical system 17a allows an obtained focal point of the infrared ray itself to be conjugated with the fluid to be measured in an interior of the measurement tube 11 formed of transparent or opaque synthetic resin material and with the temperature sensing device 17b. The temperature sensing device 17b senses infrared ray which depends on the temperature of the fluid in the measurement tube 11 via a wavelength selecting optical filter, which is not illustrated, and measures the temperature remotely. In Example 1, since the Coriolis mass flow meter is covered with a cover to make the interior thereof a dark room, an exterior light in the periphery does not cause a disturbance in temperature measurement.

Example 2

Figure 5:
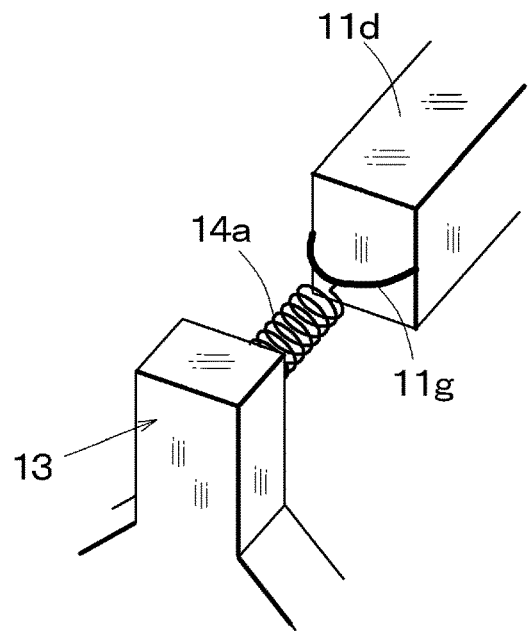
FIG. 5 is an enlarged perspective view of a principal portion of Example 2.

FIG. 5 is an enlarged perspective view of a principal portion of Example 2, in which the fixing portion 13 retains the measurement tube 11 directly via an elastic member 14a without interposing the coupling portion 12 of Example 1 therebetween. In other words, a semi-arcuate coupling ring 11g formed, for example, of a metal projects from the distal end of the locking portion 11d provided on the measurement tube 11. The locking portion 11d is coupled to the fixing portion 13 by connecting the elastic member 14a formed of a helical extension spring or the like to a distal end of the coupling ring 11g.

According to Example 2 having the configuration as described above, the measurement tube 11 is elastically attracted toward the fixing portion 13 at one point by the coupling ring 11g and the elastic member 14a and retained.

Example 3

Figure 6:
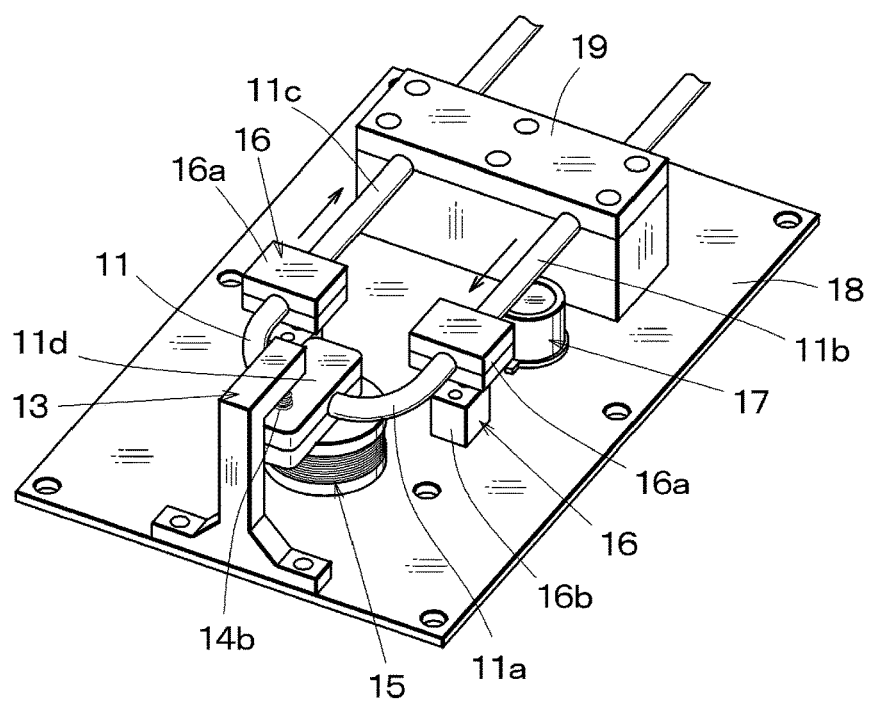
FIG. 6 is a perspective view of Example 3.
Figure 7:
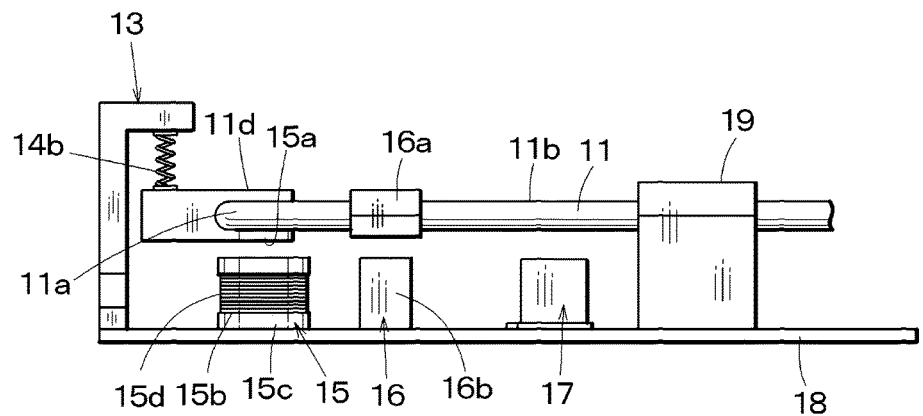
FIG. 7 is a side view of Example 3.

FIG. 6 is a perspective view of Example 3, FIG. 7 is a side view of the same, and the same reference numerals as those in Example 1 denote the same members. An upper portion of the fixing portion 13 protrudes to a position above the locking portion 11d, and an elastic member 14b formed of a helical extension spring or the like is attached between the fixing portion 13 and the locking portion 11d. The curved tube portion 11a is elastically hung in a direction orthogonal to a plane that connects the outbound tube 11b and the inbound tube 11c, that is, from the fixing portion 13 positioned above via the elastic member 14b.

A position of the measurement tube 11 retained by the elastic member 14b, that is, a position on the locking portion 11d where the elastic member 14b is attached is located in the midsection between the outbound tube 11b and the inbound tube 11c and, in addition, is elastically retained at one point. Therefore, the Coriolis force to be measured is not significantly affected.

Example 4

Figure 8:
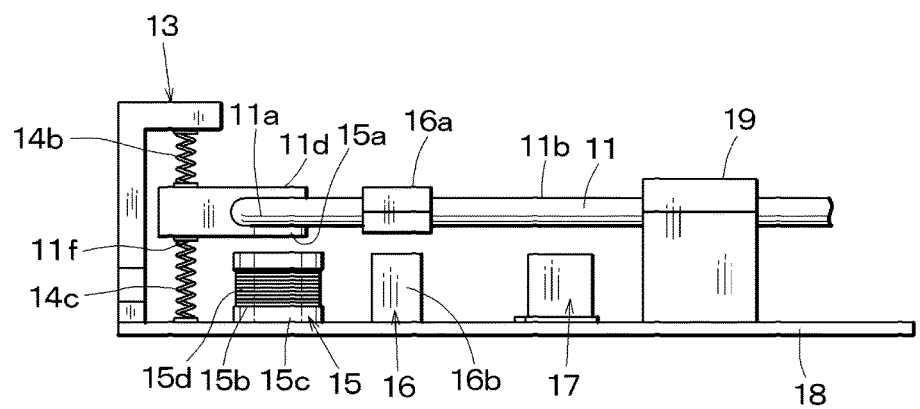
FIG. 8 is a side view of Example 4.

FIG. 8 is a side view of Example 4. Unlike Example 3, a separate second elastic member 14c formed of a coil spring or the like fixed to the substrate 18 located below is attached to a lower side of the locking portion 11d, and the locking portion 11d is attracted also downward. Points of attachment of the elastic member 14b on the upper side and the second elastic member 14c on the lower side on the locking portion 11d are aligned in the vertical direction.

According to Example 4 with the configuration described above, the curved tube portion 11a is elastically attracted in opposite directions, that is, both upward and downward at substantially one point by the elastic members 14b and 14c, and is retained at an equilibrium position by the elastic members 14b and 14c. Accordingly, the same advantageous effects as in Example 3 are achieved also with Example 4.

Example 5

Figure 9:
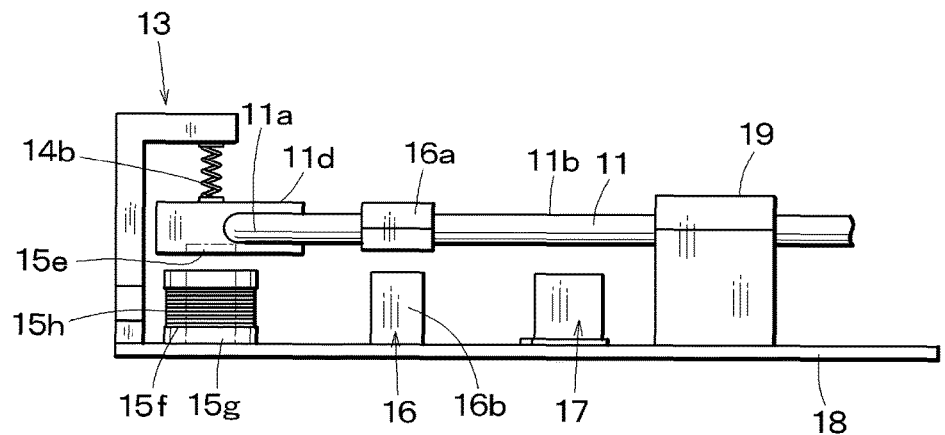
FIG. 9 is a side view of Example 5.
Figure 10:
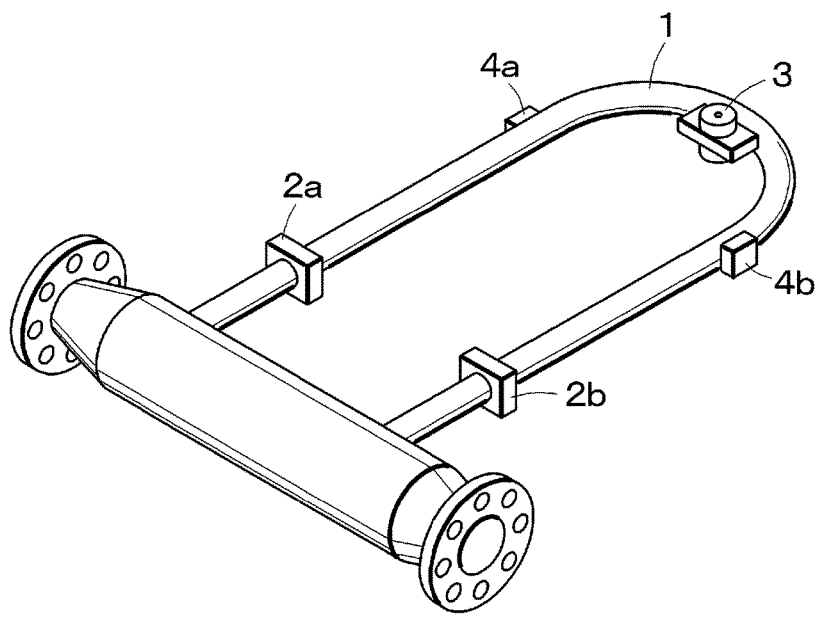
FIG. 10 is a perspective view of a Coriolis mass flow meter of the related art.

FIG. 9 is a side view of Example 5. In Example 4, the second elastic member 14c is provided on the lower side of the locking portion 11d to attract the locking portion 11d downward as well. In Example 5, an attracting mechanism which attracts downward by an electromagnetic force is used instead of the second elastic member 14c.

A magnetomotive body 15e formed of a permanent magnet or the like is attached to the lower surface of the locking portion 11d. An electromagnetic coil 15f is disposed on the substrate 18 below the magnetomotive body 15e, and a magnetic pole of an iron core 15g of the electromagnetic coil 15f is disposed so as to oppose the magnetomotive body 15e.

When a magnetic flux that attracts the magnetomotive body 15e is generated by a coil 15h wound around the iron core 15g, the curved tube portion 11a is attracted downward by the electromagnetic coil 15f via the locking portion 11d, and thus the curved tube portion 11a is retained at a predetermined position in equilibrium with an attracting force applied by the elastic member 14b on an upper side.

In this case, by sensing a position of the locking portion 11d in the vertical direction, for example, by an optical sensor and controlling an attracting force of the electromagnetic coil 15f so that the curved tube portion 11a is kept in equilibrium at the same position, the curved tube portion 11a is constantly retained at the same position.

When electricity is distributed to the coil 15h at a resonance frequency or the frequency of integral multiple of the resonance frequency with variations in magnitude of the current, a magnetic flux from the iron core 15g acts on the magnetomotive body 15e, and strong and weak magnetic attraction forces act repeatedly to function as a vibration exciter unit. Accordingly, application of vibrations to the measurement tube 11 for measurement is achieved simultaneously while elastically retaining the curved tube portion 11a. In this case, application of vibrations to the measurement tube 11 may be performed by a separate mechanism.

In respective examples, the measurement tube 11 is disposed in a horizontal direction. However, the measurement tube 11 may be oriented in the vertical direction for easy detection of the Coriolis force.

In Examples 4 and 5, the measurement tube 11 is attracted toward the substrate 18 by the elastic member including the electromagnetic coil. Instead, however, the curved tube portion 11a may be pushed back from the substrate 18 side to keep the curved tube portion 11a in equilibrium. In other words, an elastic member which acts to push back such as a compression coil spring may also be used and, in this case as well, the curved tube portion 11a may be retained accurately at the predetermined position by controlling a push-back force by the electromagnetic coil.

The terms "up" and "down" or "above" and "below" indicates the direction or position in the drawings, and are not necessarily up and down or above and below in the actual apparatus.

The invention may be applied to Coriolis mass flow meters that employs various types of measurement tubes including a straight measurement tube which is not described in the examples. Even when the measurement tube is formed of a metal, the measurement tube may be elastically retained at substantially one position, so that a large rigid supporting structure do not have to be used, which is advantageous in terms of costs.

What is claimed is:

1. A Coriolis mass flow meter comprising:
   a measurement tube that allows passage of fluid to be measured in one direction;
   a fixing portion disposed at a predetermined position with respect to the measurement tube;
   an elastic member disposed between the measurement tube and the fixing portion;
   a vibration exciter unit configured to vibrate the measurement tube; and
   a displacement detecting unit that detects displacement of the measurement tube at two positions on an outbound tube and an inbound tube of the measurement tube, wherein
   the fixing portion elastically retains the measurement tube via the elastic member,
   retention of the measurement tube is effected on a curved tube portion provided at a midpoint between the outbound tube and the inbound tube, and
   the curved tube portion is provided with a locking portion for attaching the elastic member thereto.

2. The Coriolis mass flow meter according to claim 1, wherein the measurement tube is formed of a synthetic resin.

3. The Coriolis mass flow meter according to claim 1, wherein the elastic member elastically retains the measurement tube by acting on the locking portion in a direction parallel to a plane connecting the outbound tube and the inbound tube.

4. The Coriolis mass flow meter according to claim 1, wherein the elastic member elastically retains the measurement tube by acting on the locking portion in a direction orthogonal to a plane connecting the outbound tube and the inbound tube.

5. The Coriolis mass flow meter according to claim 3, wherein the elastic member provides an attracting force.

6. The Coriolis mass flow meter according to claim 4, wherein the elastic member provides a push-back force.

7. The Coriolis mass flow meter according to claim 4, wherein a position of the curved tube portion is kept in equilibrium by causing another elastic member to act on another fixing portion also in a direction opposite to the direction of force of the elastic member.

8. The Coriolis mass flow meter according to claim 4, wherein the position of the curved tube portion is kept in equilibrium by causing an electromagnetic coil to apply an electromagnetic force on another fixing portion also in a direction opposite to the direction of force of the elastic member.

9. The Coriolis mass flow meter according to claim 8, wherein a force applied by the electromagnetic coil is generated by attaching a magnetomotive body formed of a permanent magnet or a ferromagnetic body to the curved tube portion and acting a magnetic flux from the electromagnetic coil.

10. The Coriolis mass flow meter according to claim 9, wherein a position of the locking portion is controlled by controlling the electromagnetic force by a magnitude of the magnetic flux from the electromagnetic coil by the electromagnetic coil.

11. The Coriolis mass flow meter according to claim 1, wherein a vibration exciter formed of a permanent magnet or a ferromagnetic body is attached to the locking portion to apply vibrations at a predetermined frequency to the measurement tube via the vibration exciter by the electromagnetic coil of the vibration exciter unit.

12. The Coriolis mass flow meter according to claim 2, wherein a temperature of fluid in the measurement tube formed of a transparent or translucent synthetic resin is measured remotely from outside of the measurement tube with an infrared thermometer.

13. The Coriolis mass flow meter according to claim 4, wherein the elastic member provides an attracting force.

* * * * *